(12) United States Patent
Sun et al.

(10) Patent No.: US 11,302,939 B2
(45) Date of Patent: Apr. 12, 2022

(54) DIRECT LIQUID FUEL CELL POWER GENERATION DEVICE

(71) Applicant: DALIAN INSTITUTE OF CHEMICAL PHYSICS, CHINESE ACADEMY OF SCIENCES, Dalian (CN)

(72) Inventors: Hai Sun, Dalian (CN); Shengnan Ma, Dalian (CN); Bing Qin, Dalian (CN); Gongquan Sun, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 194 days.

(21) Appl. No.: 16/621,354

(22) PCT Filed: Nov. 29, 2018

(86) PCT No.: PCT/CN2018/118058
§ 371 (c)(1),
(2) Date: Dec. 11, 2019

(87) PCT Pub. No.: WO2019/109844
PCT Pub. Date: Jun. 13, 2019

(65) Prior Publication Data
US 2020/0119377 A1   Apr. 16, 2020

(30) Foreign Application Priority Data

Dec. 4, 2017   (CN) .......................... 201711262551.5
Dec. 19, 2017  (CN) .......................... 201711372610.4

(51) Int. Cl.
*H01M 8/04302* (2016.01)
*H01M 8/0258* (2016.01)
(Continued)

(52) U.S. Cl.
CPC ..... *H01M 8/04302* (2016.02); *H01M 8/0258* (2013.01); *H01M 8/04022* (2013.01);
(Continued)

(58) Field of Classification Search
CPC ........... H01M 8/04302; H01M 8/0258; H01M 8/0267; H01M 8/2483; H01M 8/0414;
(Continued)

(56) References Cited

U.S. PATENT DOCUMENTS 6,103,410 A    8/2000  Fuller et al.
7,122,259 B2  10/2006  Takahashi
(Continued)

FOREIGN PATENT DOCUMENTS

CN   101587961 A    11/2009
CN   101997126    *  3/2011
(Continued)

OTHER PUBLICATIONS

Written Opinion issued by the international search authority dated Feb. 13, 2019 for PCT/CN2018/118058.
(Continued)

*Primary Examiner* — Matthew W Van Oudenaren
(74) *Attorney, Agent, or Firm* — Enshan Hong; MagStone Law, LLP (57) ABSTRACT

A direct liquid fuel cell power generation device comprises a direct liquid fuel cell system and a low-temperature auxiliary starting component. A heat exchanger is arranged at a stack cathode inlet. The heat of a fuel solution at a stack anode outlet is used to heat the air. The heat generated by an electronic load for starting is used to heat a condenser. The heat of a methanol solution at a liquid outlet of a gas-liquid separator is used to preheat high-concentration fuel flowing into a refueling pump. Starting and operation in a low-temperature environment can be realized through auxiliary
(Continued)

heating of external power supplies such as the low-temperature auxiliary starting component or an in-vehicle cigarette lighter. Organic micromolecule substances such as methanol and ethanol are used as fuel and are subjected to catalytic combustion in a catalytic combustor.

16 Claims, 3 Drawing Sheets

(51) Int. Cl.
*H01M 8/04014* (2016.01)
*H01M 8/04029* (2016.01)
*H01M 8/04223* (2016.01)
*H01M 8/0432* (2016.01)
*H01M 8/04007* (2016.01)
*H01M 8/04082* (2016.01)
*H01M 8/1011* (2016.01)
*H01M 8/04119* (2016.01)

(52) U.S. Cl.
CPC ... *H01M 8/04029* (2013.01); *H01M 8/04253* (2013.01); *H01M 8/04365* (2013.01); *H01M 8/04037* (2013.01); *H01M 8/04164* (2013.01); *H01M 8/04201* (2013.01); *H01M 8/1011* (2013.01)

(58) Field of Classification Search
CPC ......... H01M 8/04022; H01M 8/04029; H01M 8/04037; H01M 8/04253; H01M 8/04365; H01M 8/04373; H01M 8/04201; H01M 8/04164; H01M 8/04268; H01M 8/1011; H01M 8/1013; H01M 8/04225; H01M 8/04223; H01M 8/04731; H01M 8/04738; H01M 2250/20
See application file for complete search history.

(56) References Cited

U.S. PATENT DOCUMENTS

| | | | |
|---|---|---|---|
| 7,901,823 B2 | 3/2011 | Hayashi et al. | |
| 2006/0112613 A1 | 6/2006 | Arimura et al. | |
| 2006/0141338 A1* | 6/2006 | Wang | H01M 8/0234 |
| | | | 429/410 |
| 2010/0310954 A1 | 12/2010 | Odgaard | |

FOREIGN PATENT DOCUMENTS

| | | |
|---|---|---|
| CN | 101997126 A | 3/2011 |
| CN | 105390715 A | 3/2016 |
| CN | 105762398 A | 7/2016 |
| CN | 106992307 A | 7/2017 |
| JP | 2005-085403 A | 10/2005 |
| WO | 2012103537 A2 | 8/2012 |

OTHER PUBLICATIONS

International Search Report issued by the international search authority dated Feb. 13, 2019 for PCT/CN2018/118058.

* cited by examiner

DIRECT LIQUID FUEL CELL POWER GENERATION DEVICE

RELATED APPLICATIONS

This is a U.S. national stage of international application No. PCT/CN2018/118058 filed on Nov. 29, 2018, which claims priority from China Patent Application Nos. 201711262551.5 filed on Dec. 4, 2017 and 201711372610.4 filed on Dec. 19, 2017, the entire content of which is incorporated herein as reference.

TECHNICAL FIELD

The present invention relates to a direct liquid fuel cell power generation device started in a low-temperature environment, specifically comprises a direct methanol fuel cell system and a low-temperature auxiliary starting component, and particularly relates to a direct methanol fuel cell system applicable to starting in a low-temperature environment of −20° C. to −40° C.

BACKGROUND

A direct methanol fuel cell (DMFC) is a chemical reaction device that directly converts chemical energy in methanol into electric energy. The DMFC has the advantages that the structure is simple, reforming of fuel is not needed, main reaction products are water and carbon dioxide, and the DMFC is an environmentally friendly green energy source. The DMFC is considered to be one of the ideal miniaturized mobile power supplies, and has broad application prospects in transportation, communications, military matters and aerospace.

Most DMFCs use high-concentration or pure methanol as the fuel, but a low-concentration methanol solution reacts in an electrode catalytic layer, and is easy to freeze in an environment below 0° C. The pure methanol has a freezing point of −97° C. and can be directly stored in a low-temperature environment. When the DMFC is started in the low-temperature environment of −20° C. to −40° C., if cold air directly enters the cathode of a fuel cell stack, not only the temperature distribution of the stack is uneven, but also a cathode gas diffusion layer that first contacts the cold air easily freezes locally, affecting performance. Because the pure methanol of −20° C. to −40° C. greatly influences the sealing material in a pump, it is difficult to purchase a micro fuel pump suitable for delivering the pure methanol of −20° C. to −40° C. If the air and the pure methanol are preheated through an electric heating mode, power consumption is increased and output electric energy of the system is reduced.

In the low-temperature environment, although the methanol solution in the DMFC system is drained and damage to components such as a gas-liquid separator due to the freezing of the methanol solution can be avoided, the DMFC cannot be started normally if the methanol solution is not included in a gas-liquid separation assembly when used again. In the transportation process of the DMFC in winter, it is difficult to ensure that the system is always in the environment above 0° C. An auxiliary solution for starting the system in the environment of −20° C. to −40° C. has frozen to ice and cannot be added to the DMFC. As a mobile power supply, limited by volume and weight, most secondary batteries integrated in the DMFC use lithium batteries which have small capacity generally. Moreover, the discharge capacity of ordinary lithium batteries is greatly reduced in the environment of −20° C. to −40° C., and it is difficult to provide more electric energy for heating.

U.S. Pat. No. 6,103,410 discloses a method of introducing a small amount of oxidant and a small amount of fuel such as hydrogen into a stack cathode, and generating a reaction by the fuel and the oxidant under the action of a cathode catalyst to release heat and generate water. The ice in the stack can be melted and the stack can be heated to a temperature for starting. However, the operation is also easy to reduce the activity of the cathode catalyst, and is easy to damage the electrode structure. Moreover, the method needs to mix the hydrogen with the oxidant, which is each to case a safety accident due to misoperation. If the pure methanol is introduced into the cathode of a direct methanol fuel cell, a violent reaction occurs, thereby damaging the electrode. The methanol solution has frozen in the low-temperature environment.

Chinese invention patent 200910012179.1 discloses a low-temperature starting system and starting method for a proton exchange membrane fuel cell. A heat storage bag made of phase change material placed in a coolant is used to store waste heat generated during the operation of the fuel cell. When starting under low-temperature conditions, the heat storage bag firstly releases heat, the coolant is heated, and then the stack is heated by the coolant. After the fuel cell works normally, the heat storage bag stores the heat again. The direct methanol fuel cell has no coolant, and cools the water produced by the cathode or the methanol solution of an anode depending on the air to control the temperature of the stack.

Chinese invention patent 201510741934.5 discloses a low-temperature starting fuel cell system and a utilization method. A low-temperature cold starting system comprises a fuel cell system, a low-temperature cold starting heating device, a fuel cell control system and a power utilization end. The fuel cell control system comprises a control board and a control power supply. The low-temperature cold starting heating device is used to heat a cathode inlet pipeline, an anode inlet pipeline and a cooling circuit of a stack by an electric heating or water vapor heating mode. At the same time, the load on the power utilization end is increased to heat the fuel cell. The fuel cell system is provided with a heating controller, and temperature sensors are respectively arranged at the connection ends of an anode loop, a cathode loop, a cooling loop and a heating loop. Although the method can accelerate the cold start of the fuel cell at low temperature on the premise of ensuring the safety of the electrode, more electric energy is needed. If the electric energy of the heater comes from the control power supply in the system, the capacity of the control power supply must be large enough and the discharge capacity shall not be greatly affected by low temperature. Moreover, a heating controller needs to be arranged for detecting and controlling the temperature of each pipeline.

To sum up, the existing low-temperature starting system and method may damage the electrode or are not suitable for the structure of the direct methanol fuel cell, or need large-capacity batteries for heating in the system, which have certain limitations.

A liquid fuel cell is a chemical reaction device that converts chemical energy of liquid fuel into electric energy. The liquid fuel cell has broad application prospects in the field of portable mobile power supplies for its advantages of high theoretical specific energy density and simple system.

As a mobile power supply, in addition to high discharge performance, the liquid fuel cell also needs to have good stability and environmental adaptability. Under low temperature conditions, on one hand, the electrode reactivity is low, and the cell performance is obviously reduced. On the other hand, water is generated in the reaction process of the cell. When the environmental temperature is lower than 0° C., the water reserved in the cell will quickly freeze, making it often difficult to start the liquid fuel cell.

U.S. Pat. No. 7,901,823 discloses a low-temperature starting method of a proton exchange membrane fuel cell (PEN/WC) using hydrogen as fuel. Two independent liquid passages are arranged in the method. When starting at low temperature, liquid in one passage is heated by an external heating device.

U.S. Pat. No. 7,122,259 discloses a low-temperature starting method of a proton exchange membrane fuel cell (PEN/WC) using hydrogen as fuel. The method uses dry hot gas through a hydrogen passage, an oxygen passage and a coolant passage to heat and melt the ice and start the PEN/WC.

CN106992307A discloses a liquid circulating subsystem of a fuel cell stack power generation system, and the liquid circulating subsystem uses deionized water. The liquid circulating subsystem comprises a low-temperature starting preheating subsystem. The patent does not further describe the low-temperature starting preheating subsystem.

In the aspect of a methanol fuel cell, US2004003397 discloses a method of preventing solution freezing of a methanol fuel cell at low temperature by adding dimethoxymethane. US20060112613 discloses a method of preventing solution freezing of a methanol fuel cell at low temperature by adding $(OH)_m—R^1—R^2—(OH)_n$, wherein R1 and R2 are free radicals of indane or indene structure. US20100310954 discloses a method of preventing solution freezing by adding monohydric alcohol or polyol or inert gas purging. WO2012103537 discloses a method of keeping a methanol fuel cell not shut down in a low-temperature environment to maintain internal temperature of a cell system to prevent solution freezing.

To sum up, at present, the low-temperature starting technology of the methanol fuel cell system is rarely involved.

SUMMARY OF THE INVENTION

In view of the above defects in the prior art, the present invention provides a direct liquid fuel cell power generation device, a direct methanol fuel cell system and a low-temperature auxiliary starting component started in a low-temperature environment, and particularly relates to a direct methanol fuel cell system applicable to starting in a low-temperature environment of −20° C. to −40° C. The present invention can directly use the heated released by catalytic combustion of organic micro molecule raw materials, such as methanol and ethanol as a heat source of the system and has the advantages of easy guarantee of the raw materials, simple operation and the like.

A direct liquid fuel cell power generation device comprises a direct liquid fuel cell system; the direct liquid fuel cell system comprises a fuel cell stack, an air pump, a gas-liquid separator, a fuel circulating pump and a condenser; a gas outlet of the air pump is connected with a stack cathode inlet pipeline, and a stack cathode outlet is connected with a cathode material recovering port pipeline of the gas-liquid separator through the condenser; a liquid outlet of the gas-liquid separator is connected with a stack anode inlet pipeline through the fuel circulating pump, and a stack anode outlet is connected with an anode material recovering port pipeline on the gas-liquid separator; the gas-liquid separator is provided with a cathode material recovering port, an anode material recovering port, an auxiliary solution inlet and the liquid outlet.

The gas-liquid separator is a closed container; a transverse partition board is arranged in the middle of the closed container to divide the interior of the closed container into an upper and a lower chambers which are not connected with each other; the upper chamber is a cathode material gas-liquid separation chamber; the lower chamber is an anode material gas-liquid separation chamber; a through hole is formed on the partition board; an annular protrusion is arranged around the through hole on the upper surface of the partition board; a conduit is arranged at the lower part of the through hole; the upper end of the conduit is tightly connected with the through hole; the lower end of the conduit extends below a liquid level in the anode material separation chamber.

The cathode material gas-liquid separation chamber is provided with the cathode material recovering port in the middle-upper part and is provided with a tail gas outlet in the upper part.

The anode material gas-liquid separation chamber is provided with an anode material recovering port in the middle-upper part, and is provided with a liquid outlet and an auxiliary solution inlet in the lower part; the anode material gas-liquid separation chamber is provided with a gas outlet on the upper part; the gas outlet is communicated with the middle-upper part of the cathode material gas-liquid separation chamber through a pipeline, or a through hole as a carbon dioxide discharge port is formed on the partition board; and carbon dioxide passing through the carbon dioxide discharge port passes through a liquid layer on the upper surface of the partition board and enters the cathode material gas-liquid separation chamber.

The direct liquid fuel cell system also comprises an auxiliary starting power interface and a liquid fuel delivery port; the liquid fuel delivery port is connected with the auxiliary solution inlet of the gas-liquid separator through a liquid fuel communicating tube; the auxiliary starting power interface is connected with an electric heating element wound outside the liquid fuel communicating tube through a conducting wire; the auxiliary starting power interface is connected with the electric heating element arranged on a lower wall surface in an anode material gas-liquid separation chamber through the conducting wire; the power generation device also comprises a low-temperature auxiliary starting component; the low-temperature auxiliary starting component comprises an auxiliary solution storage tank, an electric heater, a solution delivery pump, a low-temperature power supply and an auxiliary power supply plug.

The electric heater is arranged on the bottom of the auxiliary solution storage tank to heat a solution in the auxiliary solution storage tank; the low-temperature power supply powers the electric heater, or powers the electric heater and the solution delivery pump at the same time.

The liquid outlet of the solution delivery pump is communicated with the liquid fuel delivery port of the direct liquid fuel cell system through the pipeline; a liquid inlet of the solution delivery pump is connected with the auxiliary solution storage tank through the pipeline; the auxiliary power supply plug is electrically connected with the auxiliary starting power interface of the direct liquid fuel cell system directly or through a voltage converter to power the electric heating element of the direct liquid fuel cell system in a starting phase.

The electric heater in the low-temperature auxiliary starting component is a PTC heater; the electric heating element of the direct liquid fuel cell system is one or more than one of an electric heating strip, or an electric heating wire, or an electric heating belt, or the PTC heater.

The low-temperature power supply is a low-temperature lithium battery or a lead-acid battery.

The direct liquid fuel cell system comprises a first heat exchanger; a stack anode outlet solution is used as hot fluid of a first heat exchanger; stack cathode inlet gas is used as the cold fluid of the first heat exchanger for realizing the function of preheating the stack cathode inlet gas by the stack anode outlet solution.

The direct liquid fuel cell system also comprises an electronic load for starting and a controller; the electronic load for starting is arranged on the condenser; and the electronic load for starting is connected with the fuel cell stack in parallel, is also electrically connected with the controller, and works in the starting phase of the stack to heat the condenser.

The direct liquid fuel cell system is structurally separated from the low-temperature auxiliary starting component and can be quickly connected through the auxiliary starting power interface and a liquid delivery port.

The gas-liquid separator in the direct liquid fuel cell system is also provided with a high-concentration fuel inlet; a high-concentration fuel inlet pipeline is connected with an outlet of a refueling pump; and the fluid in an inlet pipeline of the refueling pump is preheated through the fluid in the pipeline connected with the fuel circulating pump through the liquid outlet of the gas-liquid separator.

An air pressure equalizing tube is arranged on the upper part of the auxiliary solution storage tank in the low-temperature auxiliary starting component.

A liquid volume in the auxiliary solution storage tank can be obtained by a visible scale on the tank.

The fuel cell stack has an inner cavity for heating; and hot tail gas generated after organic fuel is subjected to catalytic combustion flows through the inner cavity to heat the stack.

The inner cavity has any one or a combination of more than one of the following structures; a hollow closed inner cavity is arranged in one or more than one bipolar plate inside the stack; the inner cavity is provided with an inlet and an outlet; a hollow closed inner cavity is arranged in one or two stack end plates, and the inner cavity is provided with a gas inlet and a gas outlet; one or more than one heat conducting plate attached to the stack is arranged outside the stack; a hollow closed inner cavity is arranged in the heat conducting plate; and the inner cavity is provided with a gas inlet and a gas outlet; a heat conducting tube attached to the stack is arranged outside the stack; a chamber in the heat conducting tube is the inner cavity through which the hot tail gas flows; and both ends are a gas inlet and a gas outlet.

The heat generated after the organic fuel passes through a catalytic combustion module can heat components such as a hydrothermal management component in the liquid fuel cell system through a heating pipeline.

The catalytic combustion module comprises a catalytic combustor, a fuel pump, an air pump and an electronic control. The catalytic combustor comprises a combustion chamber; a catalyst is arranged in the combustion chamber; the combustion chamber is provided with a fuel inlet connected with the fuel pump; the combustion chamber is provided with an air inlet connected with the air pump; and the combustion chamber is provided with a tail gas outlet.

The combustor is provided with a heating strip/heating sheet; and the low-temperature power supply is used to heat the catalytic combustor at low temperature so that the catalytic combustor can perform catalytic combustion at low temperature.

The catalyst adopted in the catalytic combustor is one of a precious metal catalyst, a transition metal hydride catalyst and a double oxide catalyst.

The stack end plates are made of stainless steel or aluminum alloy.

The catalytic combustor in the present invention can heat by the electric heating strip under low temperature conditions to be above 0° C., so that a catalytic combustion reaction can occur. A heating drug for a thermal battery can also be used, and ignited to release heat for heating the catalytic combustor to be above 0° C. for generating the catalytic combustion reaction.

One catalyst (commonly selected) adopted in the catalytic combustor is $Pt/Al_2O_3$.

The present invention solves the low-temperature starting problem of the liquid fuel cell that cannot be solved in the prior art, is favorable for starting the liquid fuel cell system at low temperature, enhances the low temperature environmental adaptability of the liquid fuel cell, and expands the application range.

DESCRIPTION OF PREFERRED EMBODIMENTS

Figure 1:
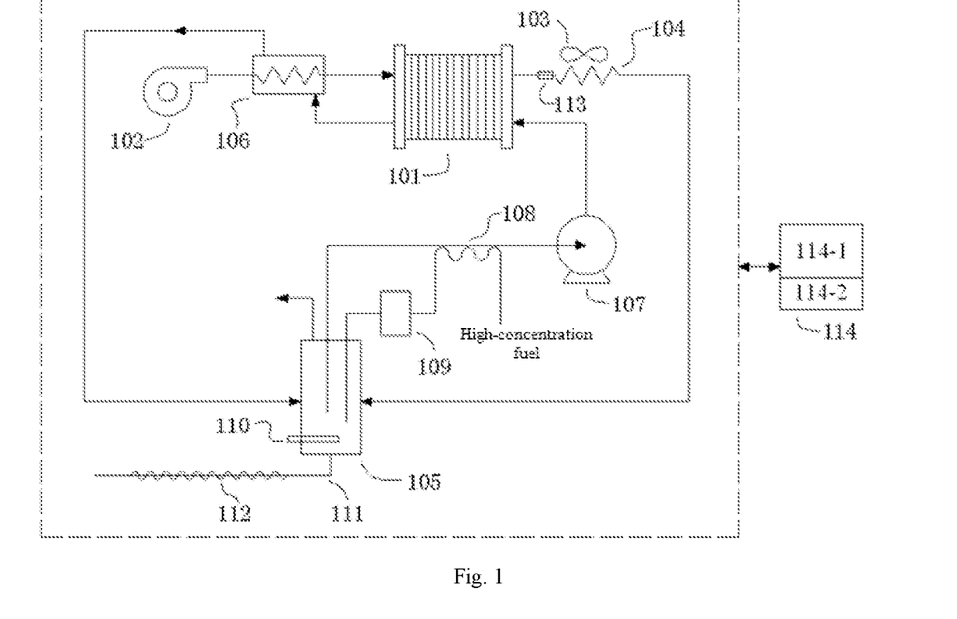
FIG. 1 is a structural schematic diagram of a direct liquid fuel cell system in the present invention.
Figure 2:
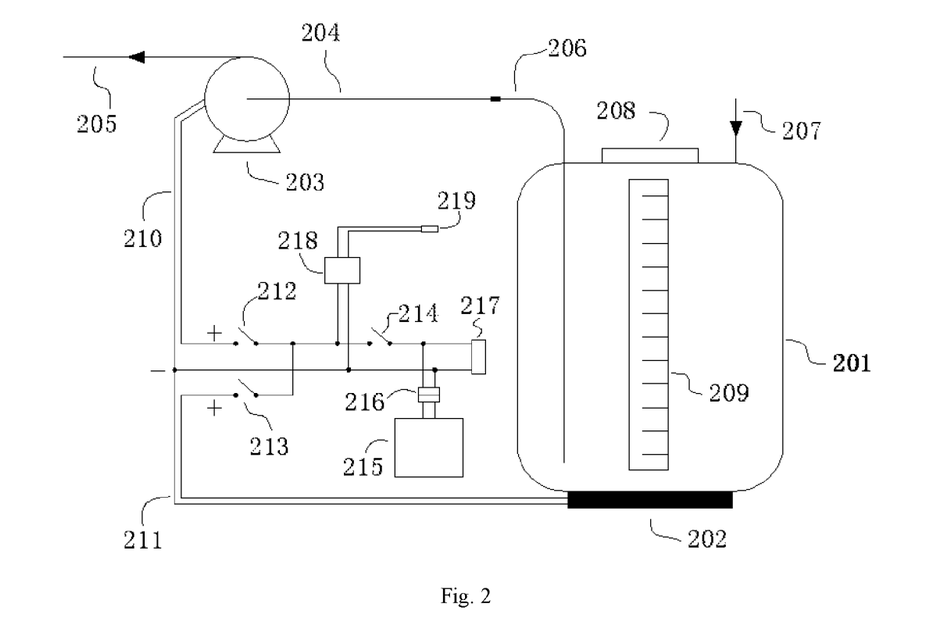
FIG. 2 is a structural schematic diagram of a low-temperature auxiliary starting component in the present invention.
Figure 3:
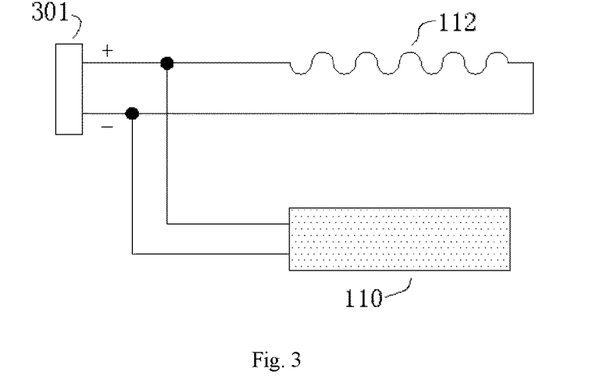
FIG. 3 is a schematic diagram of connection of a gas-liquid separator heater and an electric heating wire of a liquid fuel communicating tube.
Figure 4:
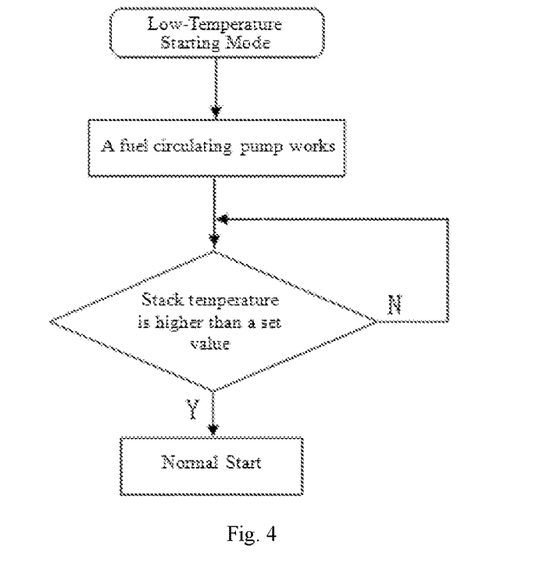
FIG. 4 is a schematic diagram of a software flow of a low-temperature starting mode of a direct methanol fuel cell system in the present invention.
Figure 5:
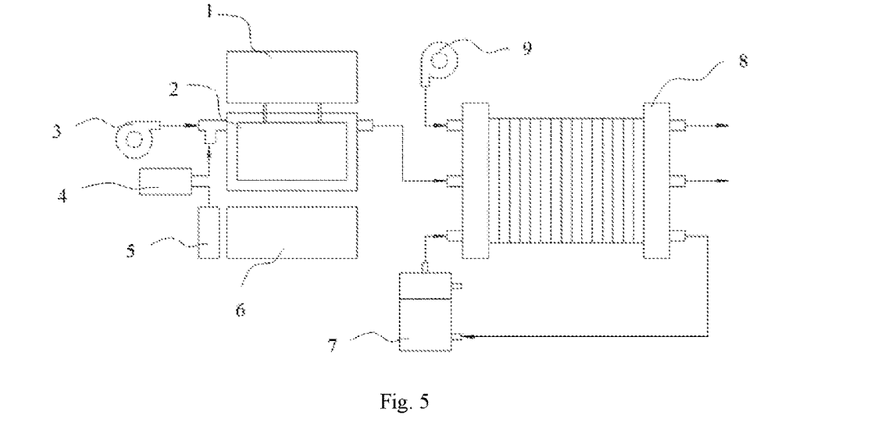
FIG. 5 is a schematic diagram of connection for low-temperature starting of a fuel cell in the present invention.
Figure 6:
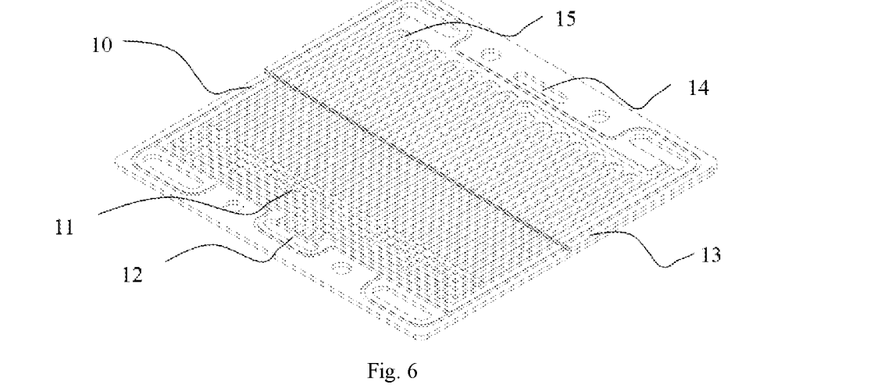
FIG. 6 is a schematic diagram of a heating inner cavity of a stack bipolar plate.
Figure 7:
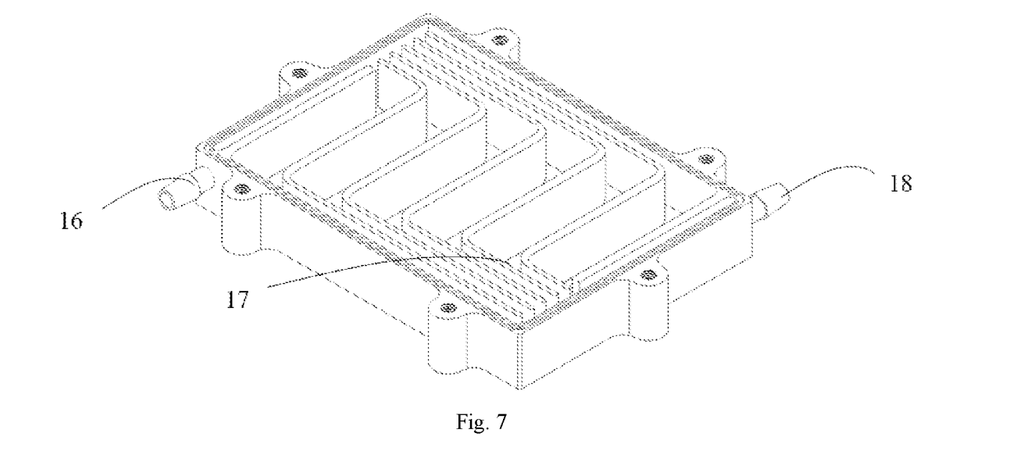
FIG. 7 is a structural schematic diagram of a catalytic combustor.

FIG. 1 is a structural schematic diagram of a direct liquid fuel cell system in the present invention;

in the figure: 101 fuel cell stack; 102 air pump; 103 fan; 104 condenser; 105 gas-liquid separator; 106 first heat exchanger; 107 fuel circulating pump; 108 preheating pipeline; 109 refueling pump; 110 gas-liquid separator heater; 111 liquid fuel communicating tube; 112 electric heating wire of liquid fuel communicating tube; 113 electronic load for starting; 114 controller comprising a controller 114-1 and a secondary battery 114-2;

101 is a fuel cell stack, which directly converts chemical energy stored in fuel into electric energy; 102 is an air pump, which delivers air to a stack cathode; 103 is a fan, which can be started and stopped to adjust condensing efficiency of a condenser; 104 is a condenser used to condense water vapor of a cathode outlet; 105 is a gas-liquid separator, which separates carbon dioxide gas from anode material and separates water from cathode material, and also dilutes the added high-concentration fuel or pure fuel; 106 is a first heat exchanger which uses the heat of a methanol solution which flows out of a stack anode outlet to heat the air; 107 is a fuel circulating pump used for delivering liquid fuel for the stack; 108 is a preheating pipeline which uses the heat of the methanol solution in a pipeline that connects a liquid outlet of a gas-liquid separator with a fuel circulating pump to preheat high-concentration fuel; 109 is a refueling pump which supplements the preheated high-concentration fuel or pure fuel into the gas-liquid separator according to an output signal of a controller; 110 is a gas-liquid separator heater which can heat the methanol solution and keep certain temperature; 111 is a liquid fuel communicating tube of which one end is connected with the bottom of the gas-liquid separator, and the other end is a liquid fuel delivery port fixed to the outer wall of the DMFC system, and which can be used for injecting the methanol solution into the gas-liquid separator and draining the methanol solution from the gas-liquid separator; 112 is an electric heating wire of liquid fuel communicating tube, wherein a resistance value is a constant value and the electric heating wire generates heat after power-on, to heat the liquid fuel communicating tube; 113 is an electronic load for starting, which is connected with the fuel cell stack in parallel, controlled by the controller, installed on the condenser, and works in a system starting stage, to accelerate the increase of the stack temperature and shorten the starting time, wherein the heated generated by the electronic load for starting is used for heating the condenser, preventing condensed water in the electronic load for starting from freezing due to extremely low temperature of the condenser and avoiding blocking the interior of the condenser; 114 is a controller comprising a controller and a secondary battery;

FIG. 2 is a structural schematic diagram of a low-temperature auxiliary starting component in the present invention;

in the figure: 201 auxiliary solution storage tank; 202 auxiliary solution storage tank heater; 203 solution delivery pump; 204 liquid inlet tube of solution delivery pump; 205 liquid outlet tube of solution delivery pump; 206 auxiliary solution delivery tube; 207 air pressure equalizing tube; 208 upper cover of auxiliary solution storage tank; 209 liquid level window with scale lines; 210 power line of solution delivery pump; 211 power line of heater; 212 power switch of solution delivery pump; 213 heater power switch; 214 main power switch; 215 low-temperature power supply; 216 electric connector of low-temperature power supply; 217 electric connector of external power supply; 218 voltage converter; 219 auxiliary power supply plug;

201 is an auxiliary solution storage tank used for storing an auxiliary solution and having thermal insulation material on an outer surface of a side wall; 202 is an auxiliary solution storage tank heater which is powered on to heat the auxiliary solution storage tank; 203 is a solution delivery pump used for delivering the auxiliary solution and delivering the methanol solution in the gas-liquid separator of the direct methanol fuel cell into the auxiliary solution storage tank; 204 is a liquid inlet tube of solution delivery pump, which is coated with the thermal insulation material on the outer wall; 205 is a liquid outlet tube of solution delivery pump, which is coated with the thermal insulation material on the outer wall; 206 is an auxiliary solution delivery tube; generally, the liquid inlet tube of solution delivery pump is connected with the auxiliary solution delivery tube; when the system needs to be started, the liquid outlet tube of solution delivery pump is connected with the liquid fuel delivery port of the direct methanol fuel cell; the heated auxiliary solution is injected into the direct methanol fuel cell system; when the direct methanol fuel cell system needs to be stored in the low-temperature environment, the liquid outlet tube of solution delivery pump is connected with the auxiliary solution delivery tube; a liquid inlet tube of a liquid pump is connected with the liquid fuel delivery port of the direct methanol fuel cell; the methanol solution in the gas-liquid separator can be drained to prevent the methanol solution from freezing in the low-temperature environment and damaging components such as the gas-liquid separator; 207 is an air pressure equalizing tube used for equalizing pressure inside and outside the auxiliary solution storage tank; 208 is an upper cover of the auxiliary solution storage tank, which can be opened to quickly add the auxiliary solution and can also be cleaned; 209 is a liquid level window with scale lines, which can be used for observing a liquid level therein and judging the quantity of the delivered auxiliary solution through the scale lines; 210 is a power line of a solution delivery pump; 211 is a power line of a heater; the negative pole of the power line of the solution delivery pump is connected with the negative pole of the power line of the heater; 212 is a power switch of the solution delivery pump, which is arranged on the positive pole of the power line of the solution delivery pump; 213 is a heater power switch, which is arranged on the positive pole of the power line of the heater; 214 is a main power switch; 215 is a low-temperature power supply; 216 is an electric connector of a low-temperature power supply; the low-temperature power supply can be selected from a lead-acid battery or a low-temperature lithium battery; the low-temperature power supply provides electric energy for the solution delivery pump and the heater through the electric connector of the low-temperature power supply; the electric connector of the low-temperature power supply is disconnected, and the low-temperature power supply can be removed; 217 is an electric connector of an external power supply, which can be used for providing electric energy for auxiliary starting components through power supplies such as an in-vehicle cigarette lighter, other low-temperature power supplies and fuel cells; 218 is a voltage converter which can provide voltage output of two specifications such as 12 VDC and 24 VDC and can provide electric energy required in the starting stage for direct methanol fuel cell systems of different specifications; 219 is an auxiliary power supply plug which can be connected to the direct methanol fuel cell system for providing electric energy for the direct methanol fuel cell system;

the low-temperature auxiliary starting component mainly comprises an auxiliary solution storage tank 201 with scales, a PTC heater 202, a solution delivery pump 203, a low-temperature power supply 215, a voltage converter 218 and an external power connector 217; the auxiliary solution in the auxiliary solution storage tank 207 and the liquid fuel communicating tube and the gas-liquid separator in the direct methanol fuel cell system are heated by the auxiliary starting component, and then the auxiliary solution is filled into the gas-liquid separator; and the temperature of the stack is increased through the heat of the auxiliary solution; the present invention has the advantage that the direct methanol fuel cell system has a simple structure, does not need to integrate a large-capacity battery in the system, and can conduct auxiliary heating by the external power supplies such as the low-temperature auxiliary starting component and the in-vehicle cigarette lighter; the low-temperature auxiliary starting component adopts the PTC heater, does not need a temperature controller, has simple structure and low cost, and is easy to realize; the direct methanol fuel cell system can be separated from the low-temperature auxiliary starting component after entering a normal starting state;

FIG. 3 is a schematic diagram of connection of a gas-liquid separator heater and an electric heating wire of a liquid fuel communicating tube;

in the figure: 110 is a gas-liquid separator heater, 112 is an electric heating wire of a liquid fuel communicating tube, and their power lines are connected in parallel; 301 is an auxiliary power interface of a fuel cell, which can be used for powering the gas-liquid separator heater and the electric heating wire of the liquid fuel communicating tube; an auxiliary power supply plug of the auxiliary starting component can be matched with the auxiliary power interface of the fuel cell;

FIG. 4 is a schematic diagram of a software flow of a low-temperature starting mode of a direct methanol fuel cell system in the present invention;

after a direct methanol fuel cell system controller enters a low-temperature starting mode, a fuel circulating pump starts operation so that the auxiliary solution is circulated in the system; then the controller starts to detect the temperature of the fuel cell stack; after the temperature of the stack is higher than a set value, the system enters the normal starting state;

FIG. 5 is a schematic diagram of connection for low-temperature starting of a fuel cell in the present invention;

in the figure: 1 preheating battery; 2 heating strip or heating sheet; 3 catalytic combustion air pump; 4 fuel pump; 5 fuel tank; 6 electric control board; 7 gas-liquid separator; 8 fuel cell stack; 9 fuel cell air pump;

1 is a preheating battery used for providing electric energy for the preheating of the catalytic combustor; 2 is a heating strip or heating sheet used for converting electric energy into thermal energy for the preheating of the catalytic combustor; 3 is a catalytic combustion air pump used for providing air for the catalytic combustor; 4 is a fuel pump used for providing a stable flow of fuel for catalytic combustion; 5 is a fuel tank used for storing fuel for catalytic combustion; 6 is an electric control board used for powering the devices and controlling the operation; 7 is a gas-liquid separator, which separates carbon dioxide gas from anode material and separates water from cathode material, and also dilutes the added high-concentration fuel or pure fuel; 8 is a fuel cell stack, which directly converts chemical energy stored in fuel into electric energy; 9 is a fuel cell air pump, which delivers air to a stack cathode;

FIG. 6 is a schematic diagram of a heating inner cavity of a stack bipolar plate;

in the figure, 10 cathode bipolar plate; 11 bipolar plate heating inner cavity; 12 gas inlet; 13 anode bipolar plate; 14 gas outlet; 15 anode flow field;

10 is a cathode bipolar plate, in which one side is a cathode flow field for providing a reactant for the cathode, and the other side is a flow field for providing heat exchange for the hot gas of the catalytic combustor; 11 is a bipolar plate heating flow field which provides a heat transfer flow field for the hot gas of the catalytic combustor; 12 is a gas inlet from which the hot gas of the combustor enters the bipolar plate heating flow field; 13 is an anode bipolar plate which forms a bipolar plate assembly with a heating cavity together with a cathode bipolar plate; and the anode bipolar plate is provided with an anode flow field for the transportation of an anode reactant; 14 is a gas outlet from which the hot gas of the combustor leaves the bipolar plate to heat the flow field; 15 is an anode flow field which is a passage for transporting an anode reactant;

FIG. 7 is a structural schematic diagram of a catalytic combustor;

in the figure: 16 catalytic combustor inlet; 17 catalytic combustor flow field; 18 catalytic combustor outlet;

16 is a catalytic combustor inlet used for connecting the catalytic combustion air pump, the fuel pump and the catalytic combustor; 17 is a catalytic combustor flow field used for filling a catalyst and evenly distributing fluid; 18 is a catalytic combustor outlet used for connecting the fuel cell stack heating cavity and the catalytic combustor.

To further describe the present invention, the following embodiments are listed.

Embodiment 1

A DMFC system with a rated output power of 50 W is provided. The stack is composed of 40 single cells. The methanol solution in the gas-liquid separator is drained after the last operation. An electric heating wire with resistance of about 15Ω is wound on the communicating tube. A PTC heater with a voltage of 12 VDC, a surface temperature of 80° C. and a power of about 50 W is used for heating the gas-liquid separator. The methanol solution heats the air at the outlet of the air pump through a shell and tube heat exchanger. The methanol solution goes through a shell pass, and the air goes through a tube pass. A feeding tube of pure methanol is wound on a feeding tube of the fuel circulating pump for several circles and is preheated. The electronic load for starting is in a constant voltage mode; the maximum current is 10 A; and the set value of voltage is 20V. A PTC heater with a voltage of 12 VDC, a surface temperature of 80° C. and a power of about 80 W is used to heat the auxiliary solution storage tank. The auxiliary solution is loaded into the auxiliary solution storage tank, and the electric energy of the lead-acid battery in the auxiliary starting component is used to heat the auxiliary solution. An auxiliary starting plug is inserted into the DMFC auxiliary starting power interface to heat the communicating tube and the gas-liquid separator. When the temperature of the auxiliary solution approaches 60° C., a liquid discharge tube of the solution delivery pump of the auxiliary starting component is connected with a liquid fuel delivery port of the DMFC system, and the auxiliary solution is injected into the gas-liquid separator through the solution delivery pump. The amount of the injected auxiliary solution is judged through the scale on the side wall of the auxiliary solution storage tank; the injection is stopped after reaching the required value; and the heating for the auxiliary solution storage tank is stopped. The DMFC system is started to enter a low-temperature starting mode to circulate the heated auxiliary solution in the system. When the temperature of the stack rises to 6° C., the DMFC system enters a normal starting mode. When the temperature of the stack is increased normally, the heating for a gas-liquid separation assembly and the liquid fuel communicating tube can be stopped. When the temperature of the stack rises to 60° C., the electronic load for starting stops working.

Embodiment 2

A DMFC system with a rated output power of 200 W is provided. The stack is composed of 70 single cells. The methanol solution in the gas-liquid separation assembly is drained after the last operation. A heating wire with resistance of about 28Ω is wound on the liquid fuel communicating tube. A PTC heater with a voltage of 24 VDC, a surface temperature of 80° C. and a power of about 100 W is used for heating the gas-liquid separator. The methanol solution heats the air at the outlet of the air pump through a shell and tube heat exchanger. The methanol solution goes through a shell pass, and the air goes through a tube pass. A feeding tube of pure methanol is wound on a feeding tube of the fuel circulating pump for several circles and is preheated.

The electronic load for starting is has maximum current of 20 A, and works in a constant voltage mode, and the set value of voltage is 35V. A PTC heater with a voltage of 24 VDC, a surface temperature of 80° C. and a power of about 200 W is used to heat the auxiliary solution storage tank. The auxiliary solution is loaded into the auxiliary solution storage tank and is heated through a vehicle-mounted cigarette lighter. An auxiliary starting plug is inserted into the DMFC auxiliary starting power interface to heat the liquid fuel communicating tube and the gas-liquid separator. When the temperature of the auxiliary solution approaches 70° C., a liquid discharge tube of the solution delivery pump of the auxiliary starting component is connected with a liquid fuel delivery port of the DMFC system, and the auxiliary solution is injected into the gas-liquid separator through the solution delivery pump. The amount of the injected auxiliary solution is judged through the scale on the side wall of the auxiliary solution storage tank; the injection is stopped after reaching the required value; and the heating for the auxiliary solution storage tank is stopped. The DMFC system is started to enter a low-temperature starting mode to circulate the heated auxiliary solution in the system. When the temperature of the stack rises to 10° C., the DMFC system enters a normal starting mode. When the temperature of the stack is increased normally, the heating for the gas-liquid separator and the liquid fuel communicating tube can be stopped. When the temperature of the stack rises to 60° C., the electronic load for starting stops working.

The above only describes the specific embodiments of the present invention and the protection scope of the present invention is not limited to the above content. The change or replacement made based on the technology disclosed by the present invention shall be covered within the protection scope of the present invention.

Embodiment 3

By taking a direct methanol fuel cell (DMFC) as an example, the components are connected according to the mode of FIG. 1, wherein 1 is a preheating battery used for providing electric energy for the preheating of the catalytic combustor. 2 is a heating strip or heating sheet used for converting electric energy into thermal energy for the preheating of the catalytic combustor. 3 is a catalytic combustion air pump used for providing air for the catalytic combustor. 4 is a fuel pump used for providing a stable flow of fuel for catalytic combustion. 5 is a fuel tank used for storing fuel for catalytic combustion. 6 is an electric control board used for powering the devices and controlling the operation. 7 is a gas-liquid separator, which separates carbon dioxide gas from anode material and separates water from cathode material, and also dilutes the added high-concentration fuel or pure fuel. 8 is a fuel cell stack, which directly converts chemical energy stored in fuel into electric energy. 9 is a fuel cell air pump, which delivers air to a stack cathode. 10 is a cathode bipolar plate, in which one side is a cathode flow field for providing a reactant for the cathode, and the other side is a flow field for providing heat exchange for the hot gas of the catalytic combustor. 11 is a bipolar plate heating flow field; on the bipolar plate in the stack, a hollow closed inner cavity (as a heating flow field) is arranged in the bipolar plate, and a gas inlet and a gas outlet are arranged on the inner cavity for providing a heat transfer flow field for the hot gas of the catalytic combustor. 12 is a gas inlet from which the hot gas of the combustor enters the bipolar plate heating flow field. 13 is an anode bipolar plate which forms a bipolar plate assembly with a heating cavity together with a cathode bipolar plate; and the anode bipolar plate is provided with an anode flow field for the transportation of an anode reactant. 14 is a gas outlet from which the hot gas of the combustor leaves the bipolar plate to heat the flow field. 15 is an anode flow field which is a passage for transporting an anode reactant. 16 is a catalytic combustor inlet used for connecting the catalytic combustion air pump, the fuel pump and the catalytic combustor. 17 is a catalytic combustor flow field used for filling a catalyst and evenly distributing fluid. 18 is a catalytic combustor outlet used for connecting the fuel cell stack heating cavity and the catalytic combustor.

The air pump can be selected from DA50EE of YLK-TECH company; the fuel pump can be selected from NF11 of KNF company; the heating sheet can be selected from 12 VDC, type 50 W; and the lithium battery can be selected from 3-series 6-parallel 18650 lithium iron phosphate group. Before the fuel cell is frozen, an aqueous solution in the system is pumped out and replaced with an aqueous solution of polyol. After the fuel cell is frozen, a catalytic combustion module switch is closed; the system automatically preheats and starts the catalytic combustor; when the temperature of the fuel cell stack reaches 30° C., the aqueous solution of polyol is replaced with the aqueous solution and the replacement operation is repeated for several times to ensure that the content of the polyol is lower than 1%; and the fuel cell switch is turned on to realize low-temperature starting. When the temperature of the fuel cell stack reaches 60° C., the catalytic combustion module is closed.

Embodiment 4

By taking a direct methanol fuel cell (DMFC) as an example, the components are connected according to the modes of FIG. 1 and embodiment 1, wherein the air pump can be selected from DA50EE of YLKTECH company; the fuel pump can be selected from NF11 of KNF company; the heating sheet can be selected from 12 VDC, type 50 W; and the lithium battery can be selected from 3-series 6-parallel 18650 lithium iron phosphate group. Before the fuel cell is frozen, an aqueous solution in the system is pumped out; and nitrogen is used to purge the stack, and only a small amount of water is left. After the fuel cell is frozen, the fuel cell system switch is closed and a debugging mode is started; and only the liquid pump is allowed to work. The catalytic combustion module switch is closed; the system automatically preheats and starts the catalytic combustor; when the temperature of the fuel cell stack reaches 30° C., the aqueous solution is injected into the system; and the fuel cell switch is turned on to realize low-temperature starting. When the temperature of the fuel cell stack reaches 60° C., the catalytic combustion module is closed.

The embodiments described above are only preferred specific embodiments provided for better illustration of the present invention. The change and replacement made to details, steps, materials and component by those skilled in the art within the scope of the solution shall be included in the protection scope of the present invention.

The invention claimed is:
1. A direct liquid fuel cell power generation device, comprising a direct liquid fuel cell system; the direct liquid fuel cell system comprises a fuel cell stack, an air pump, a gas-liquid separator, a fuel circulating pump and a condenser; a gas outlet of the air pump is connected with a stack cathode inlet pipeline, and a stack cathode outlet is connected with a cathode material recovering port pipeline of the gas-liquid separator through the condenser; a liquid outlet of the gas-liquid separator is connected with a stack anode inlet pipeline through the fuel circulating pump, and a stack anode outlet is connected with an anode material recovering port pipeline on the gas-liquid separator; the gas-liquid separator is provided with a cathode material recovering port, an anode material recovering port, an auxiliary solution inlet and the liquid outlet, wherein:

the direct liquid fuel cell system also comprises an auxiliary starting power interface and a liquid fuel delivery port; the liquid fuel delivery port is connected with the auxiliary solution inlet of the gas-liquid separator through a liquid fuel communicating tube; the auxiliary starting power interface is connected with an electric heating element wound outside the liquid fuel communicating tube through a conducting wire; the auxiliary starting power interface is connected with the electric heating element arranged on a lower wall surface in an anode material gas-liquid separation chamber through the conducting wire;

the direct liquid fuel cell power generation device also comprises a auxiliary starting component; the low temperature auxiliary starting component comprises an auxiliary solution storage tank, an electric heater, a solution delivery pump, a power supply and an auxiliary power supply plug; the electric heater is arranged on the bottom of the auxiliary solution storage tank to heat a solution in the auxiliary solution storage tank; the power supply powers the electric heater, or powers the electric heater and the solution delivery pump at the same time;

a liquid outlet of the solution delivery pump is communicated with the liquid fuel delivery port of the direct liquid fuel cell system; a liquid inlet of the solution delivery pump is connected with the auxiliary solution storage tank; the auxiliary power supply plug is electrically connected with the auxiliary starting power interface of the direct liquid fuel cell system directly or through a voltage converter to power the electric heating element of the direct liquid fuel cell system in a starting phase.

2. The direct liquid fuel cell power generation device according to claim 1, wherein: the electric heater in the auxiliary starting component is a first PTC heater; the electric heating element of the direct liquid fuel cell system is one or more than one of an electric heating strip, or an electric heating wire, or an electric heating belt, or a second PTC heater.

3. The direct liquid fuel cell power generation device according to claim 1, wherein: the power supply is a lithium battery or a lead-acid battery or a super capacitor.

4. The direct liquid fuel cell power generation device according to claim 1, wherein: the direct liquid fuel cell system comprises a first heat exchanger; a stack anode outlet solution is used as hot fluid of a first heat exchanger; stack cathode inlet gas is used as a cold fluid of the first heat exchanger for realizing the function of preheating the stack cathode inlet gas by the stack anode outlet solution.

5. The direct liquid fuel cell power generation device according to claim 1, wherein: the direct liquid fuel cell system also comprises an electronic load for starting and a controller; the electronic load for starting is arranged on the condenser; and the electronic load for starting is connected with the fuel cell stack in parallel, is also electrically connected with the controller, and works in the starting phase of the stack to heat the condenser.

6. The direct liquid fuel cell power generation device according to claim 1, wherein: the direct liquid fuel cell system is structurally separated from the auxiliary starting component.

7. The direct liquid fuel cell power generation device according to claim 1, wherein: the gas-liquid separator is a closed container; a transverse partition board is arranged in the middle of the closed contained to divide the interior of the closed container into an upper and a lower chamber which are not connected with each other; the upper chamber is a cathode material gas-liquid separation chamber; the lower chamber is an anode material gas-liquid separation chamber; a through hole is formed on the partition board; an annular protrusion is arranged around the through hole on an upper surface of the partition board; a conduit is arranged at a lower part of the through hole; an upper end of the conduit is connected with the through hole; a lower end of the conduit extends below a liquid level in the anode material gas-liquid separation chamber; the cathode material gas-liquid separation chamber is provided with the cathode material recovering port and a tail gas outlet;

the anode material gas-liquid separation chamber is provided with an anode material recovering port in a middle-upper part, and is provided with a liquid outlet and an auxiliary solution inlet in a lower part; the anode material gas-liquid separation chamber is provided with a gas outlet on a upper part; the gas outlet is communicated with a middle-upper part of the cathode material gas-liquid separation chamber through a pipeline, or a through hole as a carbon dioxide discharge port is formed on the partition board; and carbon dioxide passing through the carbon dioxide discharge port passes through a liquid layer on the upper surface of the partition board and enters the cathode material gas-liquid chamber.

8. The direct liquid fuel cell power generation device according to claim 5, wherein: the gas-liquid separator in the direct liquid fuel cell system is also provided with a high-concentration fuel inlet; and a high-concentration fuel inlet pipeline is connected with an outlet of a refueling pump.

9. The direct liquid fuel cell power generation device according to claim 1, wherein: an air pressure equalizing tube is arranged on an upper part of the auxiliary solution storage tank in the low auxiliary starting component.

10. The direct liquid fuel cell power generation device according to claim 1, wherein: a liquid volume in the auxiliary solution storage tank is obtained by a visible scale on the tank.

11. The direct liquid fuel cell power generation device according to claim 1, wherein: the fuel cell stack has an inner cavity for heating; and hot tail gas generated after organic fuel is subjected to catalytic combustion flows through the inner cavity to heat the stack.

12. The direct liquid fuel cell power generation device according to claim 11, wherein: the inner cavity has any one or a combination of more than one of the following structures: a hollow closed inner cavity is arranged in one or more than one bipolar plate inside the stack; the inner cavity is provided with an inlet and an outlet;

a hollow closed inner cavity is arranged in one or two stack end plates, and the inner cavity is provided with an inlet and an outlet;

one or more than one heat conducting plate attached to the stack is arranged outside the stack; a hollow closed inner cavity is arranged in the heat conducting plate; and the inner cavity is provided with an inlet and an outlet;

a heat conducting tube attached to the stack is arranged outside the stack; a chamber in the heat conducting tube is the inner cavity through which the hot tail gas flows.

13. The direct liquid fuel cell power generation device according to claim 11, wherein: the direct liquid fuel cell power generation device further comprises a catalytic combustion module; the catalytic combustion module comprises a catalytic combustor, a fuel pump, an air pump, and an electronic control; the catalytic combustor comprises a combustion chamber; a catalyst is arranged in the combustion chamber; the combustion chamber is provided with a fuel inlet connected with the fuel pump; the combustion chamber is provided with an air inlet connected with the air pump; and the combustion chamber is provided with a tail gas outlet.

14. The direct liquid fuel cell power generation device according to claim 13, wherein: the power supply is used to heat the catalytic combustor so that the catalytic combustor can perform catalytic combustion.

15. The direct liquid fuel cell power generation device according to claim 13, wherein: a catalyst adopted in the catalytic combustor is one of a precious metal catalyst, a transition metal hydride catalyst and a double oxide catalyst.

16. The direct liquid fuel cell power generation device according to claim 12, wherein: the stack end plates are made of stainless steel or aluminum alloy.

\* \* \* \* \*